United States Patent [19]
Saccone et al.

[11] Patent Number: 5,632,505
[45] Date of Patent: May 27, 1997

[54] PRESSURE VESSEL WITH RUPTURABLE CLOSURE WALL

[75] Inventors: Paul T. Saccone, Rochester Hills; Pongdet P. Wipasuramonton, Rochester, both of Mich.

[73] Assignee: TRW Vehicle Safety Systems Inc., Lyndhurst, Ohio

[21] Appl. No.: 496,393

[22] Filed: Jun. 29, 1995

[51] Int. Cl.[6] .................................................. B60R 21/26
[52] U.S. Cl. ........................... 280/737; 222/3; 137/68.13; 137/68.23; 137/68.27; 137/68.28; 220/203.08
[58] Field of Search ..................................... 280/737, 736, 280/740, 741, 742; 222/3, 541.4, 541.3, 541.6, 541.1; 137/68.13, 68.23, 68.27, 68.28, 68.26, 68.25; 220/203.08, 261, 89.2

[56] References Cited

U.S. PATENT DOCUMENTS

| | | | |
|---|---|---|---|
| 3,567,245 | 3/1971 | Ekstrom | 280/737 |
| 3,834,412 | 9/1974 | Fannin | 137/68.23 |
| 3,834,729 | 9/1974 | Oka et al. | 222/3 |
| 3,865,273 | 2/1975 | Zeigler | 222/5 |
| 3,968,980 | 7/1976 | Hay | 280/737 |
| 4,006,919 | 2/1977 | Neuman | 280/736 |
| 4,146,047 | 3/1979 | Wood et al. | 137/68.28 |
| 4,576,303 | 3/1986 | Mundt et al. | 137/68.27 |
| 5,076,607 | 12/1991 | Woods et al. | 280/737 |
| 5,195,777 | 3/1993 | Cuevas | 280/736 |
| 5,226,561 | 7/1993 | Hamilton et al. | 280/737 |
| 5,348,344 | 9/1994 | Blumenthal et al. | 280/737 |
| 5,356,176 | 10/1994 | Wells | 280/737 |
| 5,464,247 | 11/1995 | Rizzi et al. | 280/737 |

*Primary Examiner*—Brian L. Johnson
*Assistant Examiner*—Peter C. English
*Attorney, Agent, or Firm*—Tarolli, Sundheim, Covell, Tummino & Szabo

[57] ABSTRACT

A pressure vessel (10) includes a tank (12) containing fluid under pressure, and includes a closure cap (14) for closing the tank (12). The closure cap (14) is a unitary part made entirely of a homogeneous material. The unitary part (14) includes a rupturable closure wall (20) which, when ruptured, permits fluid to flow outward from the tank (12). The unitary part (14) also includes a conduit (74) for directing fluid to flow outward from an outlet opening (120) when the closure wall (20) is ruptured. The closure wall (20) has oppositely facing inner and outer side surfaces (98,100) and includes a stress riser (96). The side surfaces (98,100) have contours which direct the fluid pressure to maintain the stress riser (96) under compressive stress and shear stress, rather than tensile stress, so as to resist creep throughout the time that the fluid is contained under pressure in the tank (12).

15 Claims, 3 Drawing Sheets

PRESSURE VESSEL WITH RUPTURABLE CLOSURE WALL

FIELD OF THE INVENTION

The present invention relates to a pressure vessel for containing fluid under pressure, and particularly relates to a pressure vessel with a rupturable closure wall.

BACKGROUND OF THE INVENTION

A pressure vessel for containing fluid under pressure may include a tank, a closure cap, and a rupturable closure wall. In such a pressure vessel, the closure wall is fixed and sealed to the closure cap. The closure cap is fixed and sealed to an outlet end of the tank to close the tank. The closure cap thus supports the closure wall in a position in which the closure wall blocks the fluid from flowing outward from the tank. Additionally, the closure cap is constructed as a manifold with a plurality of fluid outlet openings.

When the fluid is to be released from the pressure vessel, the closure wall is ruptured. As known in the art, the closure wall may be ruptured by fluid pressure forces acting outward against the closure wall, or by the impact of a piston or the like. The fluid then flows outward past the closure wall and into the closure cap, and further outward from the pressure vessel through the outlet openings in the closure cap.

A pressure vessel of the foregoing type is commonly used to contain inflation fluid for inflating an inflatable device. For example, the pressure vessel may be used to contain inflation fluid for inflating an air bag which protects a vehicle occupant upon the occurrence of a vehicle collision. In such a pressure vessel, the closure wall typically is a dome-shaped metal disk which is welded to the closure cap.

SUMMARY OF THE INVENTION

In accordance with the present invention, a pressure vessel comprises tank means for defining a storage chamber containing fluid at an elevated pressure. The pressure vessel further comprises a unitary part which is made entirely of a homogeneous material. The unitary part of the pressure vessel includes means for defining a rupturable closure wall which is normally subjected to the fluid pressure in the storage chamber. The closure wall blocks the fluid from exiting the storage chamber and, when ruptured, permits the fluid to exit the storage chamber through an outlet opening.

The unitary part of the pressure vessel further includes conduit means for defining an outlet conduit. The outlet conduit extends outward from the closure wall, and directs the fluid to flow outward from the outlet opening when the closure wall is ruptured.

The closure wall has oppositely facing inner and outer side surfaces. The closure wall further has means for defining a stress riser. The opposite side surfaces of the closure wall comprise means for normally maintaining the stress riser under stress induced by the fluid pressure in the storage chamber. The stress induced by the fluid pressure in the storage chamber consists of stress other than tensile stress.

The present invention enhances the ability of the pressure vessel to contain the fluid at an elevated pressure for a long period of time. This is because the material of the unitary part, and hence the material of the stress riser in the closure wall, is best able to resist creep under the influence of stress other than tensile stress, e.g., compressive stress or combined compressive and shear stresses.

In a first embodiment of the present invention, the closure wall has a circular shape with a central axis. The outer side surface of the closure wall faces axially outward through the outlet conduit, and has a concave contour extending across the axis. The inner side surface of the closure wall faces axially inward of the storage chamber, and has a planar contour extending across the axis. In a second embodiment of the present invention, the inner side surface of the closure wall has a convex contour extending across the axis. In both cases, the closure wall has a configuration in which fluid pressure forces are transmitted from the inner side surface to the stress riser in directions that induce only compressive and shear stresses in the stress riser.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENTS

Figure 1:
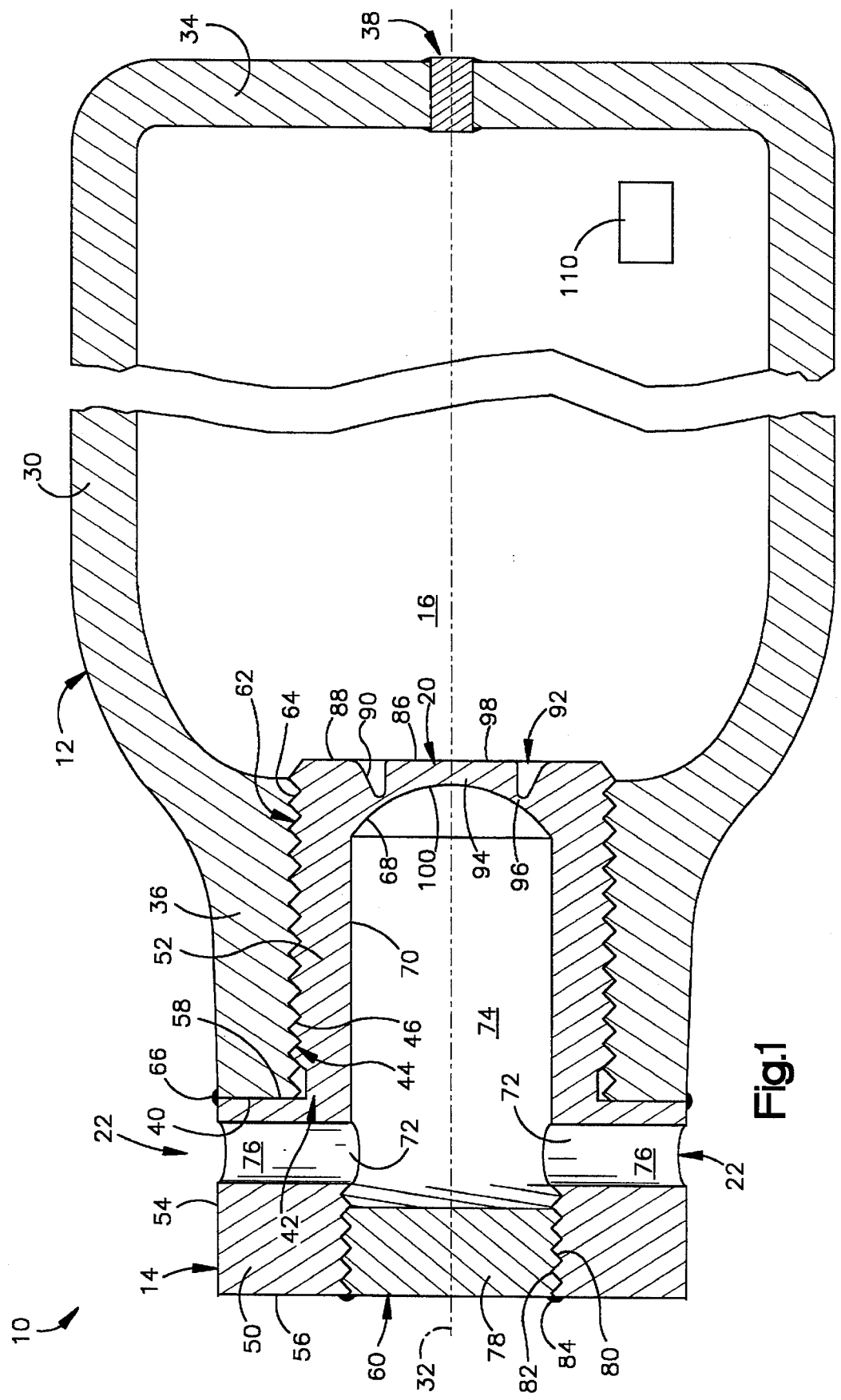
FIG. 1 is a view of an apparatus including a pressure vessel comprising a first embodiment of the present invention.
Figure 2:
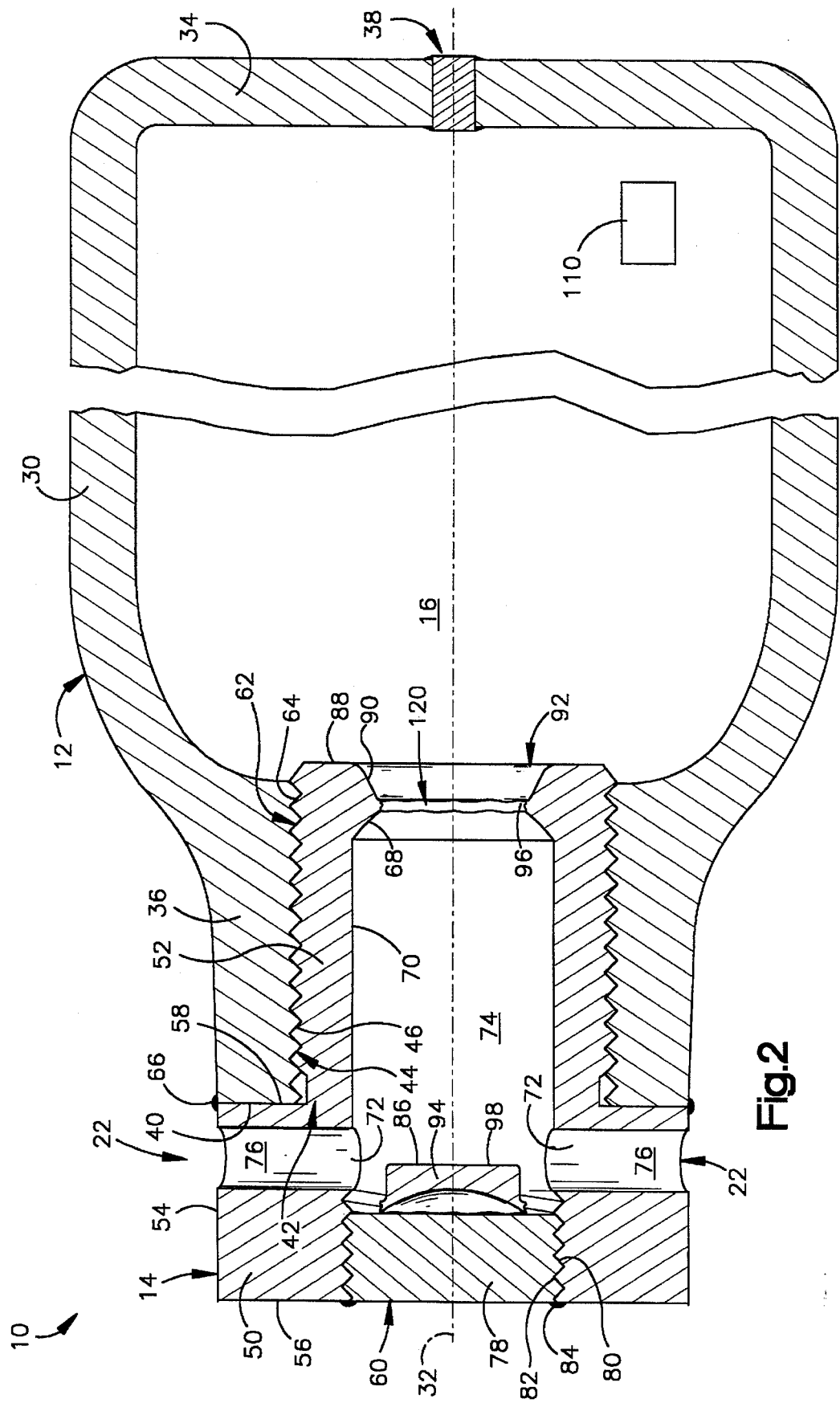
FIG. 2 is a view of the apparatus of FIG. 1 showing the pressure vessel in an opened condition.

A pressure vessel 10 comprising a first embodiment of the present invention is shown in FIG. 1. The pressure vessel 10 includes a tank 12, which is sometimes referred to as a bottle, and a closure cap 14 which closes the tank 12. The tank 12 has a storage chamber 16 containing fluid under pressure. The closure cap 14 has a rupturable closure wall 20. When the pressure vessel 10 is closed, as shown in FIG. 1, the fluid is blocked from flowing out of the storage chamber 16 by the closure wall 20. When the pressure vessel 10 is opened, as shown in FIG. 2, the closure wall 20 is ruptured, and the fluid is released to flow out of the storage chamber 16 past the closure wall 20. The fluid then flows outward through the closure cap 14 and further outward from the pressure vessel 10 through a plurality of outlet openings 22 in the closure cap 14.

The tank 12 has an elongated cylindrical body wall 30 with a longitudinal central axis 32. The tank 12 further has a circular end wall 34 at one end of the body wall 30 and a tapered, tubular neck 36 at the opposite end of the body wall 30. An inlet opening 38 at the center of the end wall 34 is closed and sealed in a known manner when the storage chamber 16 has been filled with the fluid at a desired pressure. An annular outer end surface 40 of the neck 36 defines a circular tank opening 42 which is centered on the axis 32. A cylindrical inner surface 44 of the neck 36 extends axially inward from the tank opening 42 to the storage chamber 16, and has a screw thread 46. The tank 12 is preferably formed of an aluminum alloy, but may be formed of any other suitable material known in the art.

The closure cap 14 is a unitary part made entirely of a homogeneous material. The homogeneous material in the preferred embodiment of the present invention is a ductile metal with an elongation at failure of at least 8 percent. An aluminum alloy is most preferable, but other such ductile metals also could be used. Since the closure cap 14 is constructed as a unitary part made entirely of a homogeneous material, the closure wall 20 is not a separate part. Instead, the closure wall 20 is an integral portion of the closure cap 14 which is made entirely of the same homogeneous material. Other integral portions of the closure cap 14 include a head 50 and a neck 52. The closure wall 20, the head 50, and the neck 52 may be constructed together as integral portions of the closure cap 14 by any suitable casting, machining and/or stamping process known in the art.

The head 50 of the closure cap 14 has a short cylindrical shape defined by a cylindrical outer surface 54 and a pair of annular opposite side surfaces 56 and 58. The outer side surface 56 of the head 50 defines a circular cap opening 60 which is centered on the axis 32. The inner side surface 58 of the head 50 abuts the outer end surface 40 on the neck 36 of the tank 12.

The neck 52 of the closure cap 14 has a reduced diameter, elongated cylindrical shape projecting axially inward from the inner side surface 58 of the head 50. A cylindrical outer surface 62 of the neck 52 has a screw thread 64 engaged with the screw thread 46 on the neck 36 of the tank 12. Accordingly, the closure cap 14 is installed in the position of FIG. 1 by screwing the neck 52 of the closure cap 14 into the neck 36 of the tank 12 until the inner side surface 58 on the closure cap 14 moves against the outer end surface 40 on the tank 12. When the closure cap 14 is thus engaged with the tank 12, a weld 66 is formed around the adjoining peripheries of the abutting surfaces 40 and 58 to fix and seal the closure cap 14 to the tank 12. Alternatively, a seal between the closure cap 14 and the tank 12 could be formed in any other suitable manner known in the art.

In addition to closing the tank 12, the closure cap 14 functions as a manifold for directing the fluid to flow outward from the pressure vessel 10, as described briefly above. The closure cap 14 thus has a plurality of inner surfaces for defining conduits which extend from the closure wall 20 to the outlet openings 22. These include a circular surface 68, a first cylindrical surface 70, and a plurality of smaller, additional cylindrical surfaces 72.

The circular surface 68 is centered on the axis 32 and faces axially outward from the closure wall 20. The circular surface 68 has a concave arcuate contour which, as shown in FIG. 1, is preferably spherical. The first cylindrical surface 70 also is centered on the axis 32, and extends axially outward from the circular surface 68 to the cap opening 60. Each of the additional cylindrical surfaces 72 extends radially outward from the first cylindrical surface 70 to a corresponding one of the outlet openings 22 at the outer surface 54. The closure cap 14 thus has a first cylindrical conduit 74 extending axially outward through the neck 52 from the closure wall 20 to the head 50, and has a plurality of additional, smaller cylindrical conduits 76 extending radially outward through the head 50 to the outlet openings 22.

A short cylindrical closure plug 78 has an outer screw thread 80 engaged with an inner screw thread 82 on the first cylindrical inner surface 70 of the closure cap 14. The closure plug 78 defines the outer end of the first conduit 74, and also closes the cap opening 60. A circumferentially extending weld 84 like the weld 66 fixes and seals the closure plug 78 to the closure cap 14.

The closure cap 14 further has, at the inner end of the neck 52, first and second inner end surfaces 86 and 88 facing inward of the storage chamber 16. The first and second inner end surfaces 86 and 88 are preferably coplanar with each other, and are perpendicular to the axis 32. The first inner end surface 86 has a circular shape centered on the axis 32. The second inner end surface 88 is spaced radially outward from the first inner end surface 86, and has an annular shape centered on the axis 32.

A third inner end surface 90 of the closure cap 14 also has an annular shape centered on the axis 32. The third inner end surface 90 is located radially between the first and second inner end surfaces 86 and 88, and is recessed from the plane of the first and second inner end surfaces 86 and 88. Accordingly, the third inner end surface 90 defines a circular groove 92 which extends circumferentially around the axis 32 at a location radially between the first and second inner end surfaces 86 and 88.

The closure wall 20 has a central, break-away part 94 and a rupturable peripheral part 96. The break-away part 94 has a circular peripheral shape and is bounded circumferentially by the groove 92. An inner side surface 98 of the closure wall 20 is thus defined by, and is coextensive with, the first inner end surface 86 of the closure cap 14. The peripheral part 96 of the closure wall 20 has a narrow, annular shape and extends circumferentially around the break-away part 94. The peripheral part 96 further extends axially between the concave surface 68 and the bottom of the groove 92. An outer side surface 100 of the closure wall 20 is thus defined by, and is coextensive with, a portion of the concave surface 68 which extends diametrically across the two parts 94 and 96 of the closure wall 20.

As described above, the peripheral part 96 of the closure wall 20 comprises the relatively thin material of the closure cap 14 which is located between the concave surface 68 and the bottom of the groove 92. The peripheral part 96 is constructed as a stress riser, and is designed to rupture under stress of a predetermined level. In accordance with a specific feature of the present invention, the peripheral part 96 of the closure wall 20 is maintained under stress other than tensile stress throughout the time that the fluid is contained under pressure in the storage chamber 16. Specifically, the pressure of the fluid in the storage chamber 16 acts axially outward against the inner side surface 98 of the closure wall 20 at the break-away part 94. As a result, the break-away part 94 transmits a fluid pressure force from the inner side surface 98 to the surrounding peripheral part 96. The peripheral part 96 is thus subjected to a fluid pressure force with both axially and radially acting components. The concave contour of the outer side surface 100 ensures that those force components act axially and radially outward through the peripheral part 96 in directions that induce only compressive and shear stresses. The material of the closure cap 14 is better able to resist creep under the influence of compressive and shear stresses, as compared with tensile stress, throughout the life of the pressure vessel 10.

The fluid contained under pressure in the storage chamber 16 may comprise, for example, an inflation fluid for inflating an inflatable device. In the preferred embodiment of the present invention shown in the drawings, the fluid comprises an inflation fluid for inflating a particular type of inflatable vehicle occupant restraint (not shown) which is commonly referred to as an air bag. Specifically, the inflation fluid comprises a combustible mixture of gases in accordance with the invention set forth in U.S. Pat. No. 5,348,344, assigned to TRW Vehicle Safety Systems Inc. The combustible mixture of gases is preferably contained in the storage chamber 16 at a storage pressure within the range of approximately 1500 psi to approximately 5000 psi. An igniter 110 for igniting the combustible mixture of gases is associated with the pressure vessel 10.

Figure 3:
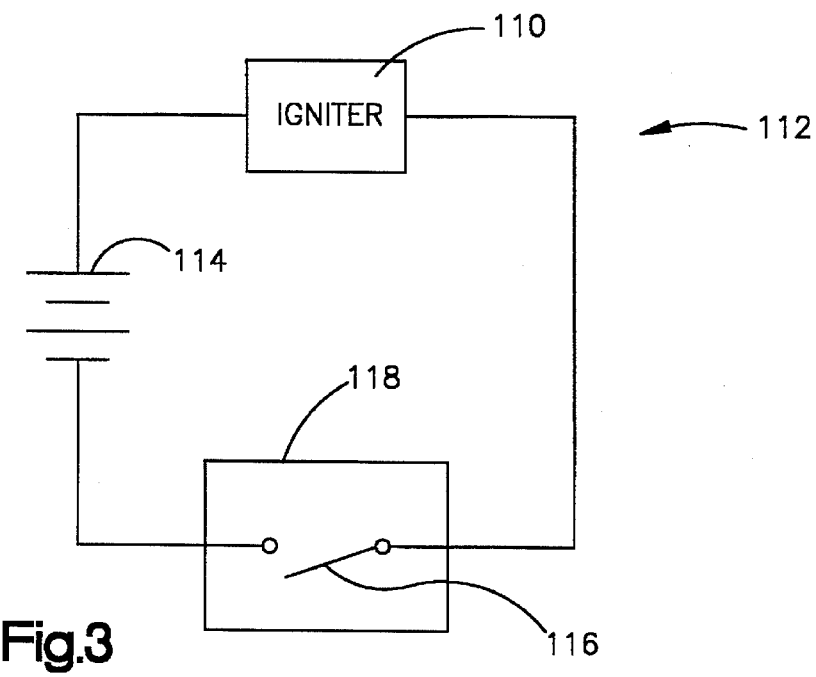
FIG. 3 is a schematic view of an electrical circuit associated with the pressure vessel of FIG. 1.

As shown schematically in FIGS. 1 and 2, the igniter 110 is preferably located in the storage chamber 16 with the combustible mixture of gases. The igniter 110 may comprise any suitable structure known in the art, such as a squib of the type which is commonly used in air bag inflators. As shown in FIG. 3, the igniter 110 is included in an electrical circuit 112. The electrical circuit 112 further includes a power source 114 and a normally open switch 116. The switch 116 is part of a collision sensor 118 which senses a condition indicating the occurrence of a vehicle collision. If the collision-indicating condition is above a predetermined threshold, it indicates the occurrence of a vehicle collision for which inflation of the air bag is desired to protect a vehicle occupant.

When the collision sensor 118 senses a collision-indicating condition above the predetermined threshold, the switch 116 is closed and the igniter 110 is actuated electrically. The igniter 110 then ignites the combustible mixture of gases in the storage chamber 16. As a result, the temperature and pressure of the combustible mixture of gases rapidly increase to further elevated levels. When the pressure reaches a predetermined elevated level, the stress induced in the peripheral part 96 of the closure wall 20 reaches the predetermined level at which the peripheral part 96 ruptures. The peripheral part 96 ruptures completely so that the break-away part 94 is separated from the neck 52 of the closure cap 14. The fluid pressure acting outward against the break-away part 94 then develops an exit flow which carries the break-away part 94 to the opposite end of the first conduit 74, as shown in FIG. 2. The inflation fluid is thus released to flow outward from the storage chamber 16 through an outlet opening 120 within the ruptured peripheral part 96 of the closure wall 20. The inflation fluid further flows outward to the outlet openings 22 through the conduits 74 and 76 in the closure cap 14, and is subsequently directed into the air bag by a known structure (not shown), such as a diffuser or a reaction canister.

Figure 4:
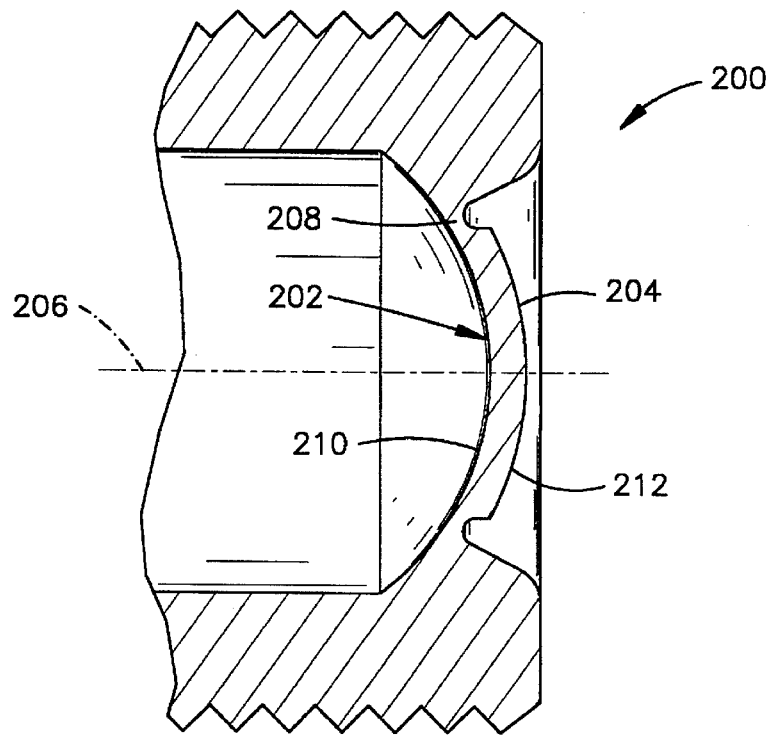
FIG. 4 is a partial view of a pressure vessel comprising a second embodiment of the present invention.

In a second embodiment of the present invention, the pressure vessel 10 includes an alternative closure cap 200 which is shown partially in FIG. 4. Like the closure cap 14 described above, the closure cap 200 is a unitary part made entirely of a homogeneous material, and is preferably made entirely of a ductile metal with an elongation at failure of at least 8 percent. The closure cap 200 includes a closure wall 202 which differs from the closure wall 20 in the closure cap 14, but otherwise has the same structure as the closure cap 14.

The closure wall 202 has a central break-away part 204 centered on an axis 206. The closure wall 202 further has a narrow, annular peripheral part 208 which also is centered on the axis 206. Like the peripheral part 96 of the closure wall 20 described above, the peripheral part 208 of the closure wall 202 is constructed as a rupturable stress riser.

A circular outer side surface 210 of the closure wall 202 has a concave arcuate contour extending diametrically across both the break-away part 204 and the peripheral part 208. A circular inner side surface 212 of the break-away part 204 is bounded by the peripheral part 208, and has a convex arcuate contour extending diametrically across the break-away part 204. The opposite side surfaces 210 and 212 of the closure wall 202 thus have arcuate radial profiles which are bowed inward of the storage chamber 16 (FIG. 1). This configuration causes the opposite side surfaces 210 and 212 to impart only compressive and shear stresses to the peripheral part 208 under the influence of the fluid pressure acting outward against the inner side surface 212. Resistance to creep is thus enhanced in a manner similar to that described above with reference to the closure wall 20.

From the above description of the present invention, those skilled in the art will perceive improvements, changes and modifications. For example, although the closure walls 20 and 202 in the preferred embodiments of the present invention are ruptured only by the force of fluid pressure in storage chamber 16, a closure wall constructed in accordance with the present invention could alternatively be ruptured in whole or in part by a piston, a projectile, or the like. Such improvements, changes and modifications within the skill of the art are intended to be covered by the appended claims.

Having described the invention, the following is claimed:

1. Apparatus comprising:

tank means for defining a storage chamber containing fluid at an elevated pressure; and a unitary part made entirely of a homogeneous material;

said unitary part including means for defining a rupturable closure wall which is normally subjected to said pressure, said closure wall blocking said fluid from exiting said storage chamber and, when ruptured, permitting said fluid to exit said storage chamber through an outlet opening;

said unitary part further including conduit means for defining an outlet conduit, said outlet conduit extending outward from said closure wall and directing said fluid to flow outward from said outlet opening when said closure wall is ruptured;

said closure wall having oppositely facing inner and outer side surfaces and means for defining a stress riser, said side surfaces comprising means for normally maintaining said stress riser under stress induced by said pressure, said stress consisting of stress other than tensile stress;

said closure wall having a central axis, said outer side surface of said closure wall facing axially outward through said outlet conduit and having a concave contour extending across said axis, said inner side surface of said closure wall facing axially inward of said storage chamber and having a planar contour extending across said axis.

2. Apparatus as defined in claim 1 wherein said stress riser surrounds a break-away portion of said closure wall which becomes separated from said unitary part upon rupturing of said stress riser.

3. Apparatus comprising:

tank means for defining a storage chamber containing fluid at an elevated pressure; and a unitary part made entirely of a homogeneous material;

said unitary part including means for defining a rupturable closure wall which blocks said fluid from exiting said storage chamber and which, when ruptured, permits said fluid to exit said storage chamber through an outlet opening;

said unitary part further including conduit means for defining an outlet conduit, said outlet conduit extending outward from said closure wall and directing said fluid to flow outward from said outlet opening when said closure wall is ruptured;

said closure wall having a central axis and oppositely facing inner and outer side surfaces, said outer side surface facing axially outward through said outlet conduit and having a concave contour extending across said axis, said inner side surface facing axially inward of said storage chamber and having a planar contour extending across said axis;

said closure wall including means for defining a stress riser, said stress riser surrounding a break-away portion of said closure wall which becomes separated from said unitary part upon rupturing of said closure wall at said stress riser;

said closure wall normally being subjected to said pressure, said side surfaces comprising means for normally maintaining said stress riser under stress induced by said pressure, said stress consisting of stress other than tensile stress.

4. Apparatus as defined in claim 3 wherein said stress includes compressive stress and shear stress.

5. Apparatus comprising:

tank means for defining a storage chamber containing fluid under pressure; and a unitary part made entirely of a homogeneous material;

said unitary part including means for defining a rupturable closure wall which blocks said fluid from exiting said storage chamber and which, when ruptured, permits said fluid to exit said storage chamber through an outlet opening;

said unitary part further including conduit means for defining an outlet conduit, said outlet conduit extending outward from said closure wall and directing said fluid to flow outward from said outlet opening when said closure wall is ruptured;

said closure wall having a central axis and inner and outer side surfaces respectively facing axially inward and outward of said storage chamber, said closure wall having a bowed configuration in which said outer side surface has a concave contour extending across said axis and said inner side surface has a convex contour extending across said axis;

said closure wall including means for defining a stress riser surrounding a break-away portion of said closure wall, said break-away portion becoming separated from said unitary part in said bowed configuration upon rupturing of said closure wall at said stress riser.

6. Apparatus as defined in claim 5 further comprising means for increasing said pressure to a predetermined elevated level, said stress riser being rupturable under stress induced by said pressure at said predetermined elevated level, said stress consisting of stress other than tensile stress.

7. Apparatus as defined in claim 6 wherein said stress includes compressive stress and shear stress.

8. Apparatus as defined in claim 5 wherein said homogeneous material is a ductile metal material with an elongation at failure of at least 8 percent.

9. Apparatus as defined in claim 8 wherein said ductile metal material comprises an aluminum alloy.

10. Apparatus as defined in claim 5 wherein said conduit means defines an additional conduit with an additional outlet opening through which said fluid emerges from said apparatus when said closure wall is ruptured, said outlet conduit extending axially outward from said closure wall to said additional conduit, said additional conduit extending radially outward from said outlet conduit to said additional outlet opening.

11. Apparatus as defined in claim 10 wherein said tank means has a tubular neck portion centered on said axis, said conduit means comprising a tubular neck portion of said unitary part which is received coaxially within said tubular neck portion of said tank means, said closure wall being located at an axially inner end of said tubular neck portion of said unitary part.

12. Apparatus as defined in claim 11 wherein said unitary part has a head portion, said head portion of said unitary part including said additional conduit and being located outside of said neck portion of said tank means.

13. Apparatus comprising:

tank means for defining a storage chamber containing fluid at an elevated pressure; and a unitary part made entirely of a homogeneous material;

said unitary part including means for defining a rupturable closure wall which is normally subjected to said pressure, said closure wall blocking said fluid from exiting said storage chamber and, when ruptured, permitting said fluid to exit said storage chamber through an outlet opening;

said unitary part further including conduit means for defining an outlet conduit, said outlet conduit extending outward from said closure wall and directing said fluid to flow outward from said outlet opening when said closure wall is ruptured;

said closure wall having oppositely facing inner and outer side surfaces and means for defining a stress riser, said side surfaces comprising means for normally maintaining said stress riser under stress induced by said pressure, said stress consisting essentially of compressive stress and shear stress;

said closure wall having a central axis, said outer side surface of said closure wall facing axially outward through said outlet conduit and having a concave spherical contour extending continuously across said stress riser and said axis, said inner side surface of said closure wall facing axially inward of said storage chamber.

14. Apparatus as defined in claim 13 wherein said homogeneous material is a ductile metal material with an elongation at failure of at least 8 percent.

15. Apparatus as defined in claim 14 wherein said ductile metal material comprises an aluminum alloy.

* * * * *